June 8, 1943.  E. B. ANDERSON  2,321,448
CONSTANT VELOCITY UNIVERSAL JOINT
Filed Dec. 19, 1941   2 Sheets-Sheet 1
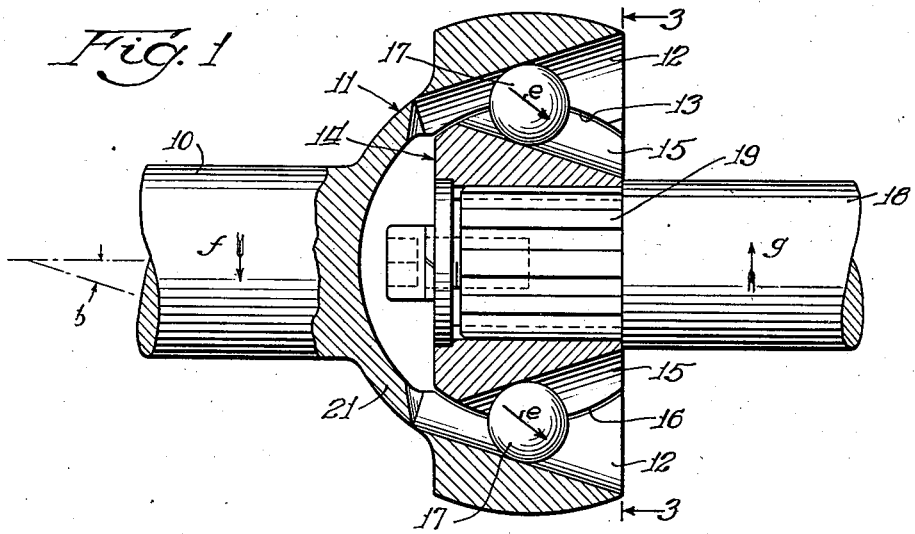
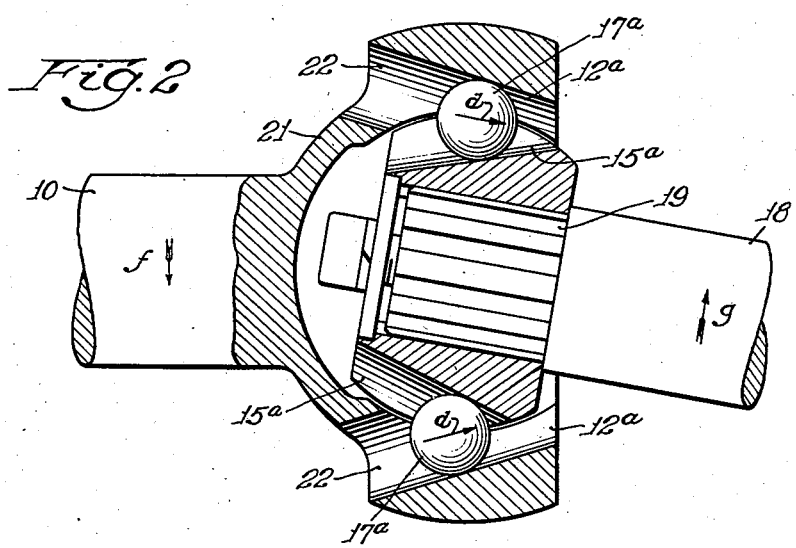
Inventor:
Edmund B. Anderson
By
Edward C. Fritzhaugh
Atty.

June 8, 1943.   E. B. ANDERSON   2,321,448
CONSTANT VELOCITY UNIVERSAL JOINT
Filed Dec. 19, 1941   2 Sheets-Sheet 2
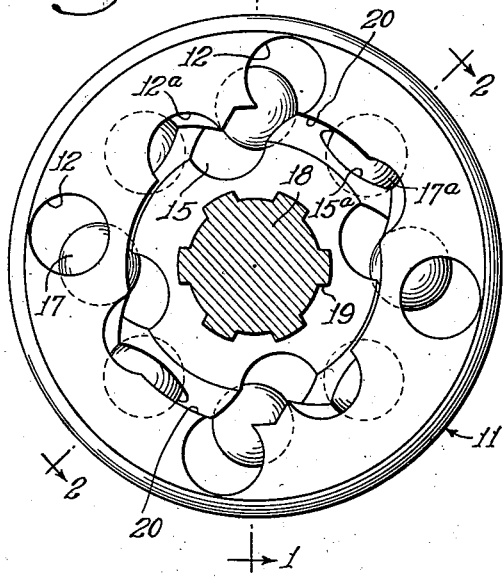
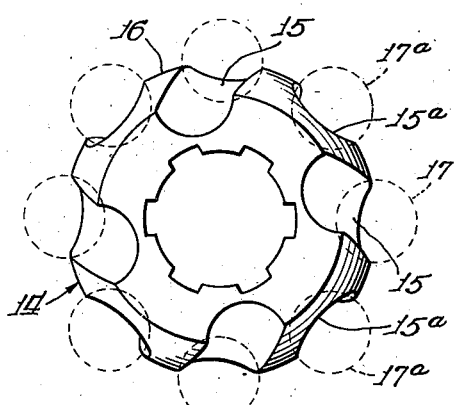
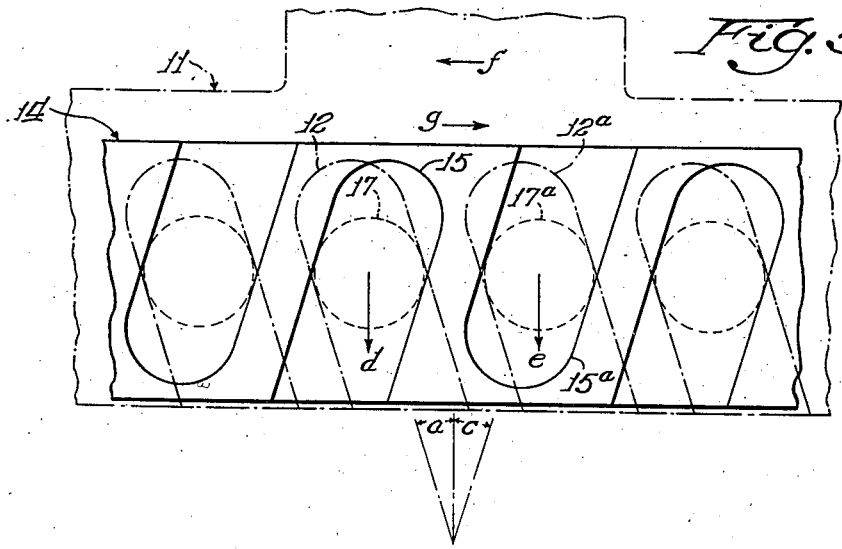
Inventor:
Edmund B. Anderson
By Edward C. Fitzhugh
Atty.

Patented June 8, 1943

2,321,448

UNITED STATES PATENT OFFICE 2,321,448

CONSTANT VELOCITY UNIVERSAL JOINT

Edmund B. Anderson, Rockford, Ill., assignor to Borg-Warner Corporation, Chicago, Ill., a corporation of Illinois Application December 19, 1941, Serial No. 423,595

6 Claims. (Cl. 64—21)

My invention relates to universal joints of the type in which torque is transmitted from a driving member to a driven member through the medium of torque transmitting elements such as bearing balls, drivingly engaged in raceways formed in the respective driving and driven members and adapted to operate in a plane constantly bisecting the axes of the driving and driven members, so as to maintain a constant velocity ratio of torque transmission.

The primary object of my invention is to provide a universal joint of the type indicated in which the balls serve not only to transmit torque but also to connect the driving and driven members together against axial separation without the assistance of ball cage means or the like.

A further object of the invention is to provide a universal joint in which the balls will remain in a plane bisecting the angle between the axes of the driving and driven members without the assistance of ball cage means or the like.

Another object of the invention is to provide a universal joint which, in addition to the characteristics above pointed out, is capable of being readily assembled and disassembled, and can be readily manufactured at a relatively low cost in comparison to joints of the same general class.

Other objects, the advantages and uses of the invention will become more apparent after reading the following specification and claims, and after consideration of the drawings forming a part of the specification, wherein:

Fig. 1 is an axial sectional view of a universal joint embodying my invention, taken as indicated by the line 1—1 of Fig. 3;

Fig. 2 is an axial sectional view of the same joint taken as indicated by the line 2—2 of Fig. 3, with the driving and driven members being shown disposed with their axes at an angle to each other;

Fig. 3 is a transverse sectional view of the same taken as indicated by the line 3—3 of Fig. 1; and Fig. 4 is an end view of the male element of the joint, the assembled positions of the balls with reference to said male element being indicated by dotted lines.

Fig. 5 is a developed view of the surface of the male member of the driving and driven members, the surface of the female member being indicated in broken lines.

It has previously been proposed to provide a universal joint in which a plurality of balls are maintained in position drivingly engaged in the raceways of a pair of driving and driven members by the crossing of the raceways so as to locate the balls at the centers of crossing. If no other means is provided for preventing axial separation of the driving and driven members, however, these members will come apart simply by an unscrewing action. One means that has been employed to prevent this from occurring is a cage member having thrust bearing engagement with the balls and with one of the driving and driven members, for example, with the interior zonal surface of the female member. It has also been proposed to reverse the direction of circumferential inclination of alternate raceways so that each alternate pair of raceways is crossed in opposite directions. In that type of joint it is possible to separate the ball cage means into a pair of rings serving as thrust elements for transmitting thrusts from the balls to the zonal interior surface of the female element.

The present invention makes it possible to eliminate ball and thrust rings entirely and utilize the balls not only for transmitting torque but also for connecting the driving and driven members in assembly. This is accomplished by a combination of circumferential and radial inclination of the raceways in a manner which will be pointed out and explained in detail hereinafter.

Referring now to the drawings, I have used the reference numeral 10 to indicate a torque transmitting shaft which may be either a driving or a driven shaft. Formed integrally with the shaft 10 is the female member 11 of the joint. The female member 11 has an interior broken up by a plurality of ball raceways 12 and 12a into a plurality of spherical zonal surfaces 13. A male member 14 has an exterior surface broken up by a plurality of ball raceways 15 and 15a into a plurality of spherical zonal surfaces 16.

The raceways 12 and 12a are inclined circumferentially, the angle of circumferential inclination being indicated at a in Fig. 5. The circumferential inclination is the same for each of the raceways 12 and 12a and is in the same direction. The raceways 12 and 12a are also inclined radially, the angle of radial inclination being indicated at b in Fig. 1 and being uniform for each of the raceways 12 and 12a. The radial inclination of alterate raceways 12 is opposite to that of the intervening raceways 12a, i. e., the raceways 12 are inclined upwardly and toward the open end of the female element 11 while the raceways 12a are inclined inwardly toward the open end of the female element 11.

The raceways 15 and 15a are inclined circumferentially, the direction of inclination and the angle (indicated at c in Fig. 5) being the same for each raceway. The raceways 15 and 15a are likewise inclined radially, the angle of radial inclination being uniform for each of the raceways, and the direction of inclination of alternate raceways 15 being opposite to that of intervening raceways 15a. The male member 14 is received within the female member 11 with each of its raceways 15 paired with a raceway 12 of the member 11 and with each of its raceways 15a paired with a raceway 12a.

The direction of circumferential inclination of the raceways 12 and 12a is opposite to that of the raceways 15 and 15a, and the pairs of raceways are consequently in crossed relation as shown in Fig. 5. At the centers of intersection of the pairs of crossed raceways are located torque transmitting balls 17 and 17a respectively. The raceways are all substantially semi-circular in cross-section so as to substantially conform to the cross-sectional contour of the torque transmitting balls 17 and 17a. Each ball is located partially in a raceway 12 or 12a and partially in a raceway 15 or 15a, whereby it may transmit torque between the driving and driven members 11 and 12.

The radial inclination of each raceway 12 or 12a is opposite to that of the raceway 15 or 15a that is paired therewith, whereby alternate pairs of raceways will diverge in one axial direction (as for example toward the right as viewed in Fig. 1), while the intervening pairs of raceways will diverge in the opposite axial direction (toward the left as viewed in Fig. 2).

A torque load applied to the balls 17 and 17a in one direction will cause one series of alternate balls to be urged toward the plane of intersection of the crossed pairs of raceways, resulting in wedging of these balls against the converging bottoms of their respective pairs of raceways. For example, driving torque applied to the female element 11 in a clockwise direction, looking toward the right in Fig. 2, will cause the series of balls 17a to be urged toward the right as far as is permitted by the converging bottoms of the coacting raceways 12a and 15a, as indicated by the arrow d in Figs. 2 and 5 respectively. This urging of the balls 17a against the converging bottoms of the raceways is the result of the wedging action of the crossed sides of the raceways against the balls. It may be noted at this point that the full lines in Fig. 5 indicate the developed surface of the male element 14, while the dotted lines indicate the developed surface of the female element 11 lying above or outside of the male element 14. The clockwise torque applied to the female element 11 is indicated by the arrow f and the opposing load of the male member is indicated by the arrow g.

The wedging of the balls 17a against the bottoms of the raceways 12a and 15a limits their axial movement under the wedging action of the crossed sides of the raceways, and therefore permits them to transmit torque from the driving to the driven element. If the raceways were not converged radially, and if no other means were provided for preventing axial movement of the balls, the wedging action of the crossed sides of the raceways would cause the balls to be squeezed out of the ends of the raceways.

The same torque load which urges the balls 17a into wedging engagement with the bottoms of their raceways tends to move the intervening series of balls 17 toward the diverging ends of the bottoms of their raceways 12 and 12a as indicated by the arrow e in Fig. 1. However, since relative rotary movement between the driving and driven elements is prevented by the balls 17a through which torque is being transmitted, the balls 17 will be caged by the crossed sides of their raceways 12 and 15 and will thereby be maintained in the plane of crossing of the raceways, while being permitted to idle without transmitting torque.

A reversal of torque will cause the idling series of balls to become the driving series and the driving series to become the idling series. For example, driving torque applied in a counter-clockwise direction to the element 11, or a coast load imposed on the element 14 will cause the balls 17 to be urged toward the converging ends of the bottoms of their raceways 12 and 15 in the direction opposite to that indicated by the arrow e. The circumferential positions of the driving and driven elements 10 and 14 relative to each other will be determined by the bottoming of the balls 17 and the balls 17a will be caged by the crossed sides of their raceways, remaining centered at the crossings.

The parts are so designed that the centers of crossing of the raceways will always remain in a plane bisecting the axes of the driving and driven elements, and as a result, the driving series of balls will transmit torque at uniform velocity. Due to tolerances required for permitting free movement of the balls in the raceways, there will necessarily be a slight amount of lost rotary motion in the reversal of torque between the driving and driven elements. Subject to this motion, which is slight, the two series of balls will hold the driving and driven elements together in substantially non-rotary relation to each other.

In a similar manner, the balls will hold the driving and driven elements against axial movement relative to each other. This will be clear when it is considered that any axial thrust of the driving or driven element against the balls will, because of the crossing of the raceways, tend to cause relative rotation between the driving and driven elements. Since such relative rotation is restrained in both directions, however, any substantial axial movement of the driving and driven elements relative to each other will be consequently restrained. Thus the two series of balls, cooperating with each other, serve as thrust bearing means for holding the driving and driven elements against relative axial movement. Accordingly, the invention makes it possible to eliminate conventional axial thrust transmitting elements which depend upon engagement with the zonal surfaces of the driving and driven elements.

The male element 14 is formed independently of the shaft 18 on which it is splined as at 19, in order to permit assembly and disassembly of the joint. The male element is inserted into the female element by turning it until its axis is at right angles to that of the female element and inserting it edgewise through the mouth of the female element, the extremities of the male element being accommodated in cut-away spaces 20 in the mouth of the female element, disposed diametrically opposite each other.

The balls 17 may be inserted by moving the male element successively to positions in which the ends of the pairs of raceways substantially register with each other. In order to attain any of these positions, it is necessary that the shaft 18 be removed. After the shaft 18 is inserted in the male element 14, it is not possible for the balls to escape from their raceways. The balls are inserted in the diverging ends of the raceways, the balls 17 being inserted from the right as viewed in Fig. 1, and the balls 17a being inserted from the left as viewed in Fig. 2. In order to make the latter insertions possible, the raceways 12a are continued through the rear wall 21 of the female element, to form openings 22 slightly larger in diameter than the balls, and through which the balls are passed.

I claim:

1. A constant velocity universal joint comprising male and female torque transmitting elements having a plurality of pairs of circumferentially crossed raceways arranged in a series of alternate pairs of raceways the bottoms of which diverge in one axial direction and a series of intervening pairs of raceways the bottoms of which diverge in the opposite axial direction, and a ball encaged between the crossed sides of each of said pairs of raceways.

2. A universal joint as defined in claim 1, wherein the axes of circumferential inclination of all of the raceways of one element are parallel and the axes of circumferential inclination of all of the raceways of the other element are likewise parallel but of the opposite hand.

3. A universal joint as defined in claim 1, wherein the female element is in the form of a cup and alternate raceways thereof are extended entirely through the wall of the cup to permit assembling of the balls.

4. A universal joint as defined in claim 1, wherein the female member has a mouth provided with diametrically opposite cut-away spaces to permit the insertion of the male element.

5. A universal joint as defined in claim 1, wherein the male element is provided with a removable shaft and is adapted, only when said shaft is removed, to be moved to positions wherein the ends of the respective pairs of raceways substantially register with each other to permit insertion or removal of the balls.

6. A constant velocity universal joint comprising male and female torque transmitting elements having a plurality of pairs of circumferentially crossed raceways including a pair of raceways the bottoms of which diverge in one axial direction and a pair of raceways the bottoms of which diverge in the opposite axial direction, and a ball encaged between the crossed sides of each of said pairs of said raceways.

EDMUND B. ANDERSON.